United States Patent
Swaminathan

(10) Patent No.: US 10,928,508 B2
(45) Date of Patent: Feb. 23, 2021

(54) CAMERA AND RADAR FUSION

(71) Applicant: Ford Global Technologies, LLC, Dearborn, MI (US)

(72) Inventor: Krithika Swaminathan, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 101 days.

(21) Appl. No.: 16/382,412

(22) Filed: Apr. 12, 2019

(65) Prior Publication Data

US 2020/0326420 A1 Oct. 15, 2020

(51) Int. Cl.
| | | |
|---|---|---|
| *G01S 13/86* | (2006.01) | |
| *G01S 13/89* | (2006.01) | |
| *G01S 13/08* | (2006.01) | |
| *G06T 7/70* | (2017.01) | |
| *G06T 7/30* | (2017.01) | |
| *G01S 13/931* | (2020.01) | |
| *G06T 3/00* | (2006.01) | |

(52) U.S. Cl.
CPC ............ *G01S 13/867* (2013.01); *G01S 13/08* (2013.01); *G01S 13/89* (2013.01); *G01S 13/931* (2013.01); *G06T 3/0018* (2013.01); *G06T 7/30* (2017.01); *G06T 7/70* (2017.01); *G06T 2207/10044* (2013.01); *G06T 2207/20221* (2013.01); *G06T 2207/30252* (2013.01)

(58) Field of Classification Search
CPC ...... G01S 13/867; G01S 13/931; G01S 13/89; G01S 13/08; G06T 7/70; G06T 7/30; G06T 3/0018; G06T 2207/30252; G06T 2207/10044; G06T 2207/20221

USPC .......................................................... 382/295
See application file for complete search history.

(56) References Cited

U.S. PATENT DOCUMENTS

| | | | |
|---|---|---|---|
| 8,049,658 B1 | 11/2011 | Lagonik et al. | |
| 9,041,915 B2 | 5/2015 | Earhart et al. | |
| 2008/0129756 A1* | 6/2008 | Iwano | G06T 3/0025 345/632 |
| 2013/0148855 A1* | 6/2013 | Yasugi | G06T 5/002 382/103 |
| 2013/0242284 A1 | 9/2013 | Zeng | |

(Continued)

FOREIGN PATENT DOCUMENTS

CN 103559791 A 2/2014

OTHER PUBLICATIONS

Németh, "New sensor concept for intra-frame scene and speed capturing" IEEE 2015 European Conference on Circuit Theory and Design (ECCTD) Year: 2015.*

(Continued)

*Primary Examiner* — Juan A Torres
(74) *Attorney, Agent, or Firm* — Frank A. MacKenzie; Bejin Bieneman PLC

(57) ABSTRACT

A system includes a computer that includes a processor and a memory. The memory stores instructions executable by the processor such that the computer is programmed to transform a vertical image plane camera image to a horizontal image plane, thereby generating a transformed camera image, generate a scaled horizontal image plane radar image based on a resolution of the transformed camera image, and then superimpose the scaled radar image on the transformed camera image thereby generating a horizontal image plane superimposed image.

17 Claims, 11 Drawing Sheets

(56) References Cited

U.S. PATENT DOCUMENTS

| | | |
|---|---|---|
| 2014/0376821 A1 | 12/2014 | Meir et al. |
| 2015/0253161 A1 | 9/2015 | Ham et al. |
| 2018/0089843 A1 | 3/2018 | Miecznik |
| 2018/0270474 A1 | 9/2018 | Liu |
| 2018/0302564 A1 | 10/2018 | Liu et al. |
| 2020/0175315 A1* | 6/2020 | Gowaikar ............... G01S 7/417 |
| 2020/0211219 A1* | 7/2020 | Yamazaki ................ G01C 3/14 |
| 2020/0218913 A1* | 7/2020 | Unnikrishnan .... G06K 9/00805 |

OTHER PUBLICATIONS

Zhou, "A New Minimal Solution for the Extrinsic Calibration of a 2D LIDAR and a Camera Using Three Plane-Line Correspondences," in IEEE Sensors Journal, vol. 14, No. 2, pp. 442-454, Feb. 2014.*

Song, "A Novel Method of Spatial Calibration for Camera and 2D Radar Based on Registration," 2017 6th IIAI International Congress on Advanced Applied Informatics (IIAI-AAI), Hamamatsu, pp. 1055-1056, Year 2017.*

Li, "Flexible extrinsic calibration of a camera and a two-dimensional laser rangefinder with a folding pattern," Appl. Opt. 55, 2270-2280. Year 2016.*

Chou et al., "Mirror-Assisted Calibration of a Multi-modal Sensing Array with a Ground Penetrating Radar and a Camera", http://faculty.cs.tamu.edu/dzsong/pdfs/Chou_Multi_Cali_IROS17_v44.pdf (2017).

Li et al—"Flexible extrinsic calibration of a camera and a two-dimensional laser rangefinder with a folding pattern", Applied Optics, vol. 55, Issue 9, https://doi.org/10.1364/AO.55.002270 (2016).

'Song et al.—"A Novel Method of Spatial Calibration for Camera and 2D Radar Based on Registration", 2017 6th IIAI International Congress on Advanced Applied Informatics (IIAI-AAI) (2017), http://doi.ieeecomputersociety.org/10.1109/ IIAI-AAI.2017.62.

Yousef et al—"Extrinsic Calibration of Camera and 2D Laser Sensors without Overlap", Sensors 2017, http://www.mdpi.com/journal/sensors.

Zhou—"A New Minimal Solution for the Extrinsic Calibration of a 2D LIDAR and a Camera . . . ", IEEE Sensors Journal ( vol. 14 , Issue: 2 , Feb. 2014 ).

* cited by examiner

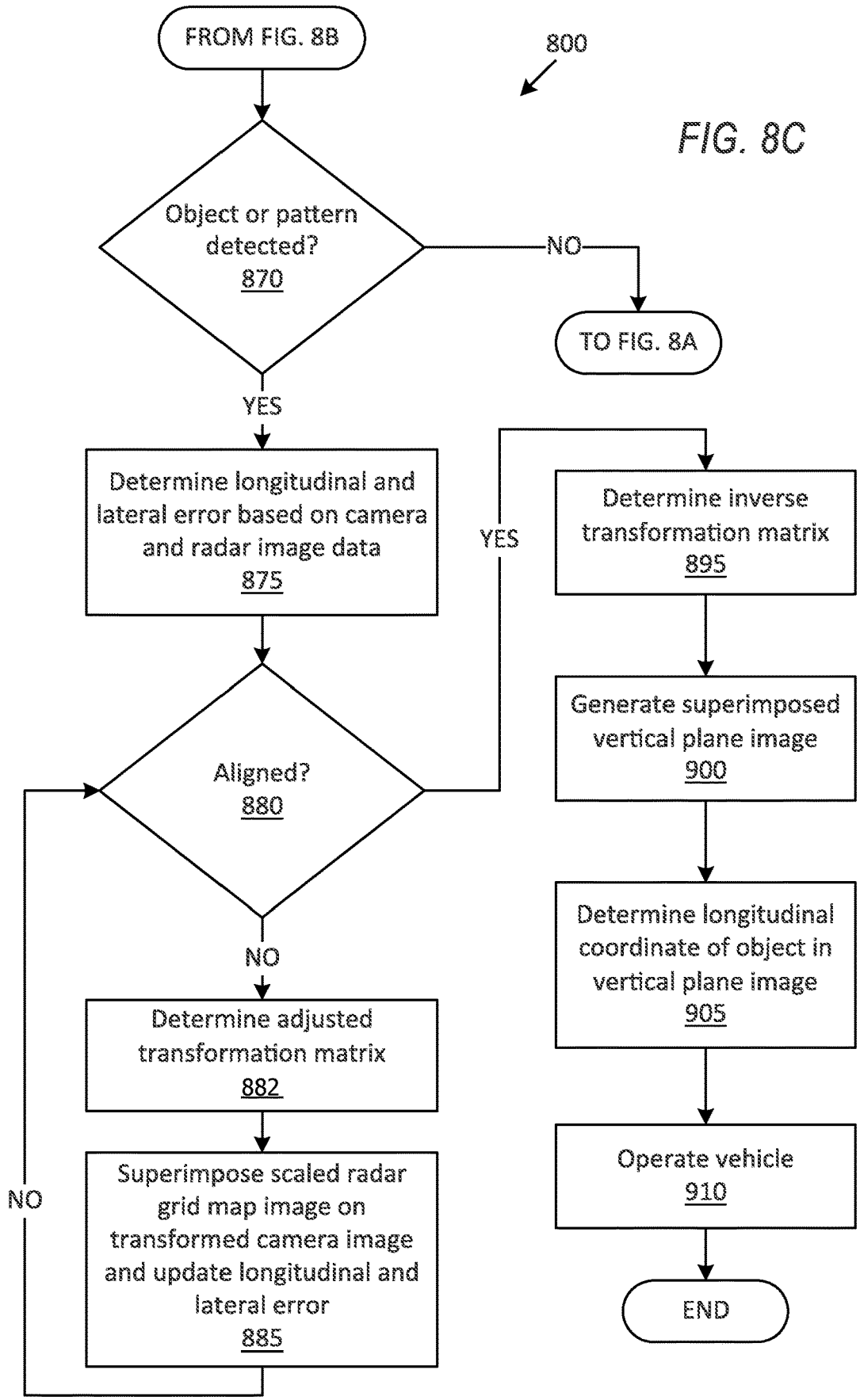

CAMERA AND RADAR FUSION

BACKGROUND

One or more computers in an autonomous vehicle (or self-driving car) can be programmed to navigate and operate the vehicle based on vehicle sensor data. The vehicle computers may rely on sensor data, e.g., camera data, radar data, etc., to detect objects.

BRIEF DESCRIPTION OF THE DRAWINGS

FIGS. 8A-8C are a flowchart of an example process for superimposing radar image of a vehicle radar sensor on a camera image of a vehicle camera sensor.

DETAILED DESCRIPTION

Introduction

Figure 1:
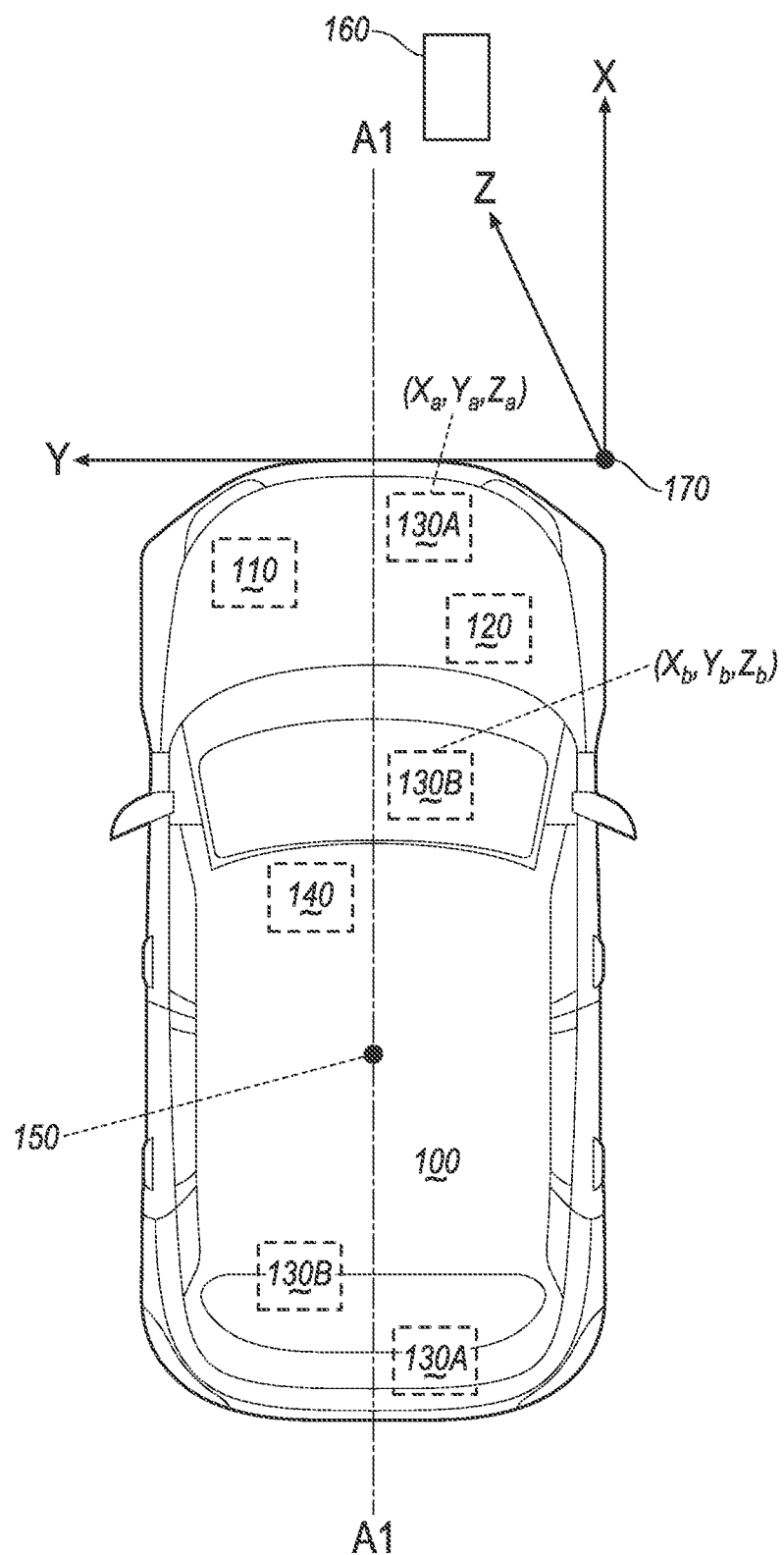
FIG. 1 is a block diagram showing an example vehicle including object detection sensors detecting an object.

A system comprises a computer that includes a processor and a memory. The memory stores instructions executable by the processor such that the computer is programmed to transform a vertical image plane camera image to a horizontal image plane, thereby generating a transformed camera image, to generate a scaled horizontal image plane radar image based on a resolution of the transformed camera image, and to then superimpose the scaled radar image on the transformed camera image thereby generating a horizontal image plane superimposed image.

The instructions may further include instructions to generate the scaled radar image further based on an occupancy grid map image extracted from received radar image.

The instructions may further include instructions to detect an object in the camera image data, identify a first location of the detected object in the transformed camera image, to identify a second location of the detected object in the radar image, and to rescale the scaled radar image to superimpose the first location of the object in the radar image on the second location of the object in the transformed camera image.

The instructions may further include instructions to determine an inverse transform function that transforms the horizontal image plane superimposed image to the vertical image plane, thereby generating a vertical image plane superimposed image that includes longitudinal coordinates of objects.

The instructions to generate the vertical image plane superimposed image may further include applying the inverse transform function to the radar image thereby generating a vertical image plane radar image, and superimposing the vertical image plane radar image on the vertical plane camera image.

The instructions may further include instructions to detect, in the transformed camera image, two or more road markings, to determine a number of pixels between the detected two or more road markings in the transformed image, and to determine the resolution of the camera image based on a real-world distance of the detected two or more road markings and the determined number of pixels between the detected two or more road markings in the transformed image.

The instructions may further include instructions to determine the resolution of the camera image based on real-world dimensions of at least one of a guard rail, light pole, traffic sign, and wall, detected in the transformed camera image.

The instructions may further include instructions to crop the radar image based on an overlapping of fields of view of the camera and image data and generate the scaled radar image from the cropped radar image.

The received vertical image plane camera image may be distorted and the instructions may further include instructions to undistort the received camera image prior to transforming the camera image to the horizontal image plane.

Further disclosed herein is a system including a radar sensor with a first field of view and a camera sensor with a second field of view, wherein the first and second fields of view at least partially overlap, and a computer, programmed to transform a vertical image plane camera image to a horizontal image plane, thereby generating a transformed camera image, to generate a scaled horizontal image plane radar image based on a resolution of the transformed camera image, and then to superimpose the scaled radar image on the transformed camera image thereby generating a horizontal image plane superimposed image.

Further a method includes transforming a vertical image plane camera image to a horizontal image plane, thereby generating a transformed camera image, generating a scaled horizontal image plane radar image based on a resolution of the transformed camera image, and then superimposing the scaled radar image on the transformed camera image thereby generating a horizontal image plane superimposed image.

The method may further comprise generating the scaled radar image further based on an occupancy grid map image extracted from received radar image.

The method may further comprise detecting an object in the camera image data, identifying a first location of the detected object in the transformed camera image, identifying a second location of the detected object in the radar image, and rescaling the scaled radar image to superimpose the first location of the object in the radar image on the second location of the object in the transformed camera image.

The method may further comprise determining an inverse transform function that transforms the horizontal image plane superimposed image to the vertical image plane, thereby generating a vertical image plane superimposed image that includes longitudinal coordinates of objects.

Generating the vertical image plane superimposed image may further include applying the inverse transform function to the radar image thereby generating a vertical image plane radar image, and superimposing the vertical image plane radar image on the vertical plane camera image.

The method may further include detecting, in the transformed camera image, two or more road markings, determining a number of pixels between the detected two or more road markings in the transformed image, and determining the resolution of the camera image based on a real-world distance of the detected two or more road markings and the determined number of pixels between the detected two or more road markings in the transformed image.

The method may further include determining the resolution of the camera image based on real-world dimensions of at least one of a guard rail, light pole, traffic sign, and wall, detected in the transformed camera image.

The method may further include cropping the radar image based on an overlapping of fields of view of the camera and image data and generating the scaled radar image from the cropped radar image.

The method may further include undistorting the horizontal image plane camera image prior to transforming the camera image to the horizontal image plane, wherein the received camera image is distorted.

Further disclosed is a computing device programmed to execute any of the above method steps.

Yet further disclosed is a computer program product, comprising a computer readable medium storing instructions executable by a computer processor, to execute any of the above method steps.

System Elements

Navigation of a land vehicle, e.g., an autonomous and/or semi-autonomous vehicle, may be based on obtaining data about objects, e.g., data including location(s), dimensions, types or classes, etc., of objects. A vehicle computer may receive data from which objects may be detected and/or described from multiple sensors, e.g., a camera sensor and a radar sensor. Fusion of data from different sensors, often of different types (e.g., camera, radar, lidar, etc.) is a technical challenge. For example, due to differences between parameters, e.g., resolution, of a radar and a camera sensor, a vehicle computer may detect an object in a first location with first dimensions based on the camera data, while detecting the object in a second location with second dimensions different from the first location and/or the first dimensions. In the present example, therefore, fusion of the camera and radar data presents a problem.

To improve sensor data fusion, among other benefits, an example system includes a computer programmed to transform a vertical image plane camera image to a horizontal image plane, thereby generating a transformed camera image, to generate a scaled horizontal image plane radar image based on a resolution of the transformed camera image, and to then superimpose the scaled radar image on the transformed camera image thereby generating a superimposed image and providing for more accurate and reliable fusion of camera and radar data, and hence more accurate and reliable detection of objects, which in turn provides for more accurate, reliable, and safe operation of a vehicle.

FIG. 1 illustrates an example host vehicle 100 including a computer 110, actuator(s) 120, one or more object detection sensors 130A, 130B, and a human machine interface (HMI 140). In one example, front-mounted radar and camera sensors 130A, 130B shown in FIG. 1 may be mounted within a predetermined distance, e.g., 10 centimeter (cm), from one another. A reference point such as a geometrical center point 150 can be specified for a vehicle 100, e.g., a point at which respective longitudinal and lateral centerlines of the vehicle 100 intersect. A vehicle 100 body may have a longitudinal axis A1. The vehicles 100 may be powered in variety of known ways, e.g., with an electric motor and/or internal combustion engine.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle and/or receive messages from the various devices, e.g., the sensors 130A, 130B, actuators 120, etc. Alternatively or additionally, in cases where the computer 110 actually comprises multiple devices, the vehicle communication network may be used for communications between devices represented as the computer 110 in this disclosure. Further, as mentioned below, various controllers and/or sensors may provide data to the computer 110 via the vehicle communication network.

The actuators 120 may be implemented via circuits, chips, or other electronic components that can actuate various vehicle subsystems in accordance with appropriate control signals as is known. The actuators 120 may be used to control braking, acceleration, and steering of the vehicle 100. As an example, the vehicle 100 computer 110 may output control instructions to control the actuators 120.

Vehicle 100 sensors 130A, 130B may provide data encompassing at least some of an exterior of the vehicle 100, e.g., a GPS (Global Positioning System) sensor, camera, radar, and/or lidar (light imaging detection and ranging). For example, a radar sensor 130A, e.g., mounted to a front, rear, and/or any other side of the vehicle 100, may provide object detection, i.e., data including dimensions and/or relative location (x, y, z) of objects 160 outside the vehicle 100 within a field of view of the radar sensor(s) 130A, e.g., with respect to two or three axes of a three-dimensional Cartesian coordinate system, e.g., where a horizontal X-Z plane is defined along with vertical X-Y and Z-Y planes 210, 220 (see FIG. 2), the planes and respective axes being orthogonal to one another. An origin 170, i.e., intersection of all three axes, of the coordinate system could be at a reference location with defined with respect to the vehicle 100, e.g., a front right corner of the vehicle 100. As another example, the origin point 170 may be located at the vehicle 100 reference point 150, at a front of the vehicle 100, or any other suitable location. The computer 110 may be programmed to determine the location, dimensions, etc., of the object(s) 160 based on the camera sensor 130B data, as further discussed with respect to FIG. 2.

The radar sensor(s) 130A transmit electro-magnetic beams, receive reflections of the transmitted beams, and measure a distance to an object 160 reflecting the beams based at least on a time-to-travel, i.e., a time interval between transmission of a beam and receiving a reflection, i.e., an echo, of the same beam by the radar sensor 130A. The radar sensor 130A may include one or more antennas, and electronic components such as chips, analog-to-digital converter, digital-to-analog converter, electro-magnetic amplifier, etc. The radar sensor 130A may include an array of antennas oriented in various respective directions. The computer 110 can be programmed to detect objects 160 based on received reflections of the transmitted beams.

A camera sensor 130B provides image data to, e.g., the vehicle 100 computer 110. The camera sensor(s) may include chips, image sensors, and optical components. The camera sensor(s) 130B may output image data based on the optical signals captured by the image sensor(s) of the camera sensor 130B. The computer 110 may be programmed to detect object(s) 160 from image data received from the camera sensor(s) 130B and determine dimension(s) and/or location of the object(s) 160, e.g., with respect to axes of the coordinate system with the origin point 170, as further discussed with respect to FIG. 2.

Object(s) 160 may be a second vehicle, bicycle, truck, pedestrian, building, traffic sign, wall, light pole, etc., within a field of view of the sensors 130A, 130B. An object 160 is a real world, i.e., physical object. Data about an object 160 is therefore what is referred to as ground truth data; it is desirable for sensors 130 to provide data from which a computer 110 can determine data representing an object 160 that is as close to ground truth data as possible. Further, in the present context, a field of view is an area of the ground surface (e.g., the horizontal plane 210) in which objects 160 can be detected by the sensors 130A, 130B. The fields of view of sensors 130A, 130B may overlap. For example, a first field of view of a radar sensor 130A mounted to a front bumper and a second field of view of a forward-looking camera sensor 130B mounted to a front windshield may overlap, i.e., substantially provide data from an area in front of the vehicle 100. The area on the horizontal plane 210 which is included in both fields of view of the camera and radar sensors 130A, 130B is herein referred to as the overlapping field of view. An overlapping field of view may include an area on the X-Y plane 210 with different shapes, e.g., oval, rectangular, non-geometrical, etc.

The computer 110 may be programmed to operate the vehicle 100 based on data received from the vehicle 100 sensor(s) 130A, 130B. The computer 110 may be programmed to actuate a vehicle 100 actuator 120, e.g., braking, steering, and/or propulsion, to adjust a vehicle 100 path, to stop, etc., based on the received sensor 130A, 130B data.

Figure 2:
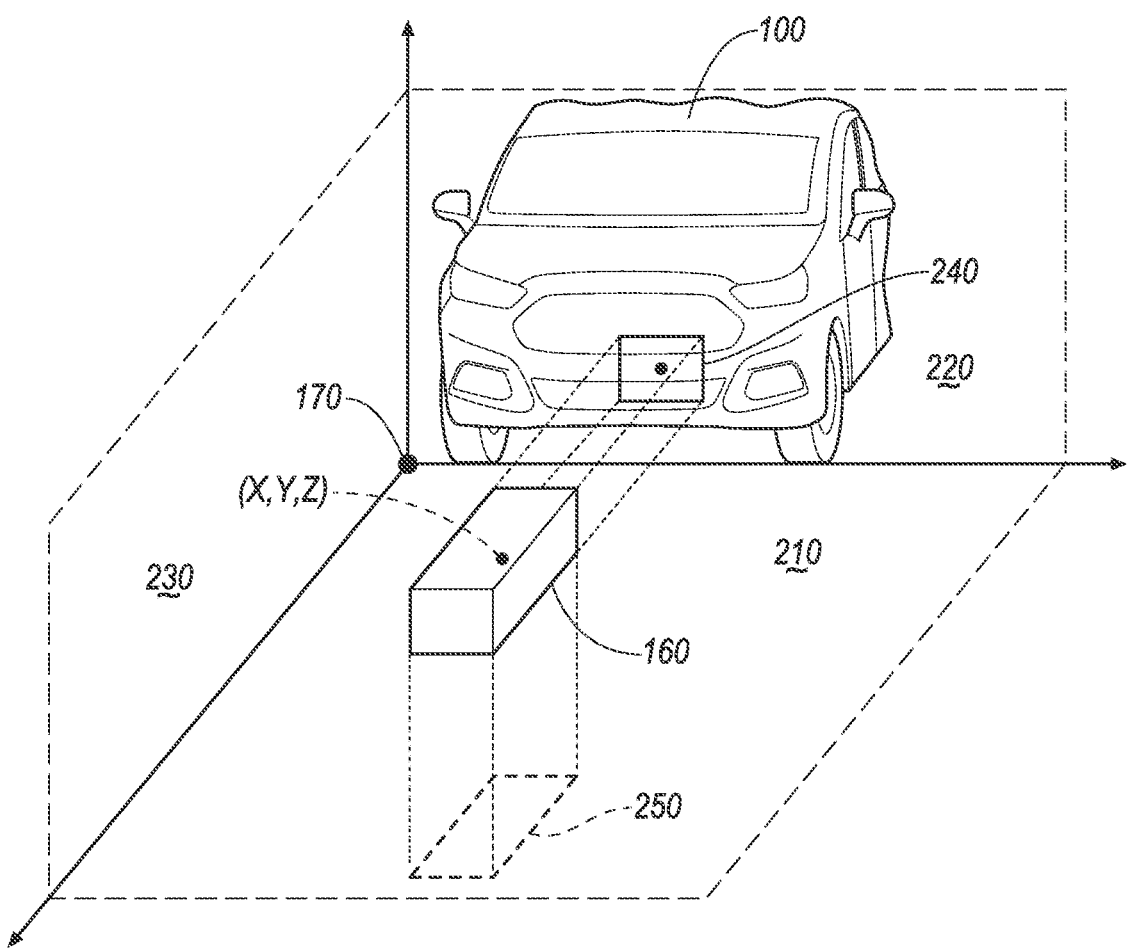
FIG. 2 illustrates the object of the FIG. 1 and projections of the object on X-Y and Y-Z planes of a three-dimensional (3D) coordinate system.

FIG. 2 shows the example object 160 and the Cartesian coordinates system of FIG. 1 with the origin 170. FIG. 2 further shows the X-Y plane (or horizontal plane 210), Y-Z plane (or vertical plane 220), and X-Z plane 230 of the coordinate system, and projections 240, 250 of the object 160 on the X-Y plane 210 and the Y-Z plane 220, respectively. As shown in FIG. 2, the object 160 (i.e., a reference point thereof) is located at coordinates (x, y, z).

In one example, e.g., the computer 110 may determine data identifying the projection 240 or the projection 250 of the object 160, rather than data describing the complete or three-dimensional object. That is, sensor(s) 130A, 130B, due to physical characteristics of the sensor 130, and/or other sensing limitations may be able to detect at most a two-dimensional representation of an object. In the present context, a physical characteristic of a sensor is (i) a shape and/or surface description of a sensor component that may result in an optical limitation of a monocular camera that results in generating an image without a depth and/or (ii) a radar magnetic detection field which may lack a detection of an elevation (height) of objects 160. For example, radar and camera sensors 130A, 130B may provide two-dimensional (2D) data. Moreover, a radar sensor 130A may provide data in a horizontal plane 210, whereas a camera sensor 130B may provide data in a vertical plane 220. Data output from radar sensor 130A may lack elevation or height data (i.e., data with respect to the Z axis or data in a vertical dimension), whereas data output from a camera sensor 130B may lack depth data (i.e., longitudinal coordinates or data with respect to the X axis). Thus, the computer 110 may determine 2D object data rather than 3D coordinates. For example, the computer 110 may determine horizontal or ground location coordinates (y, z) and/or dimensions of the projection 240 based on data received from the camera sensor 130B, and may determine location coordinates (x, y) and/or dimensions of the projection 250 based on data received from the radar sensor 130A.

Figure 3:
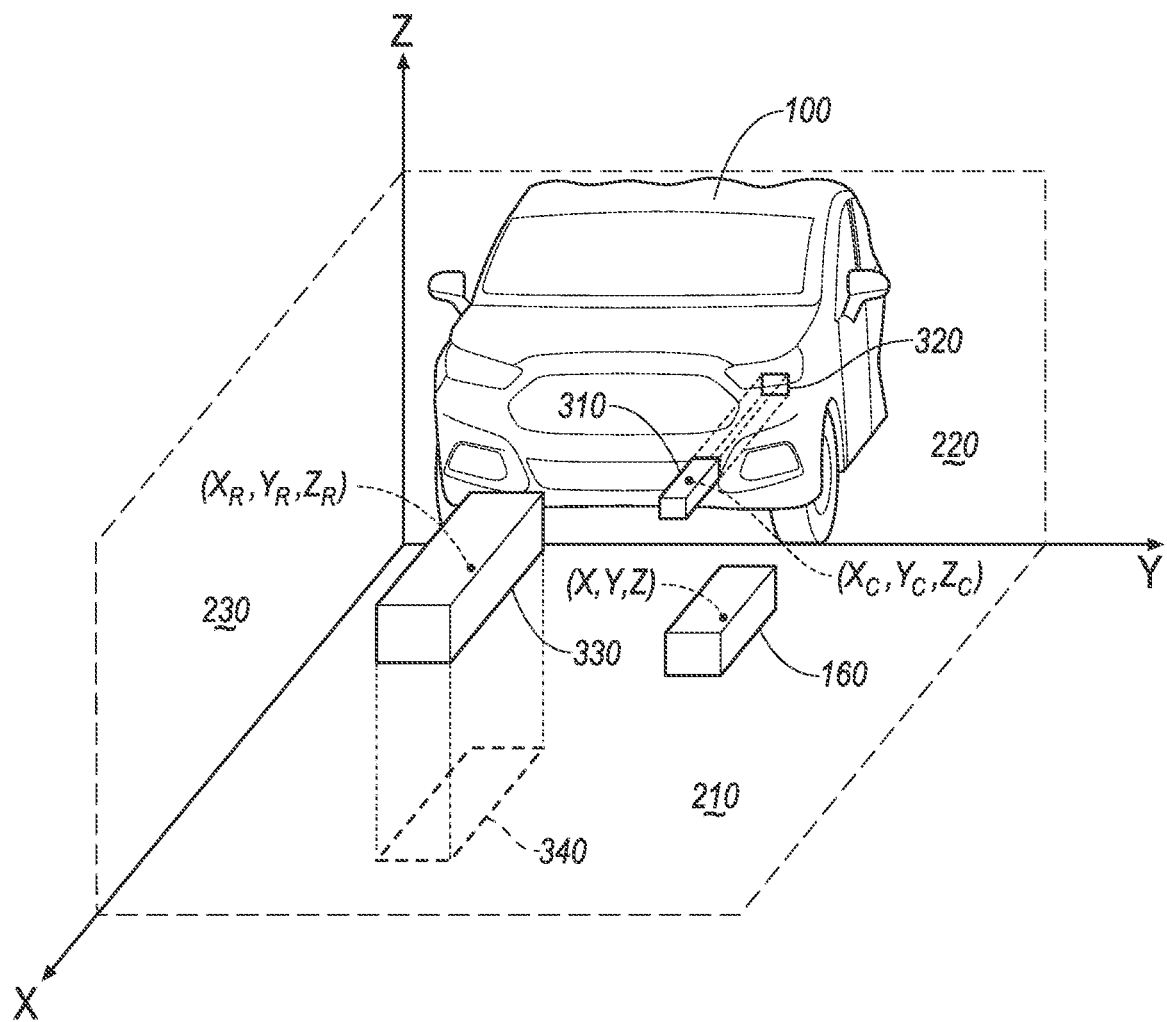
FIG. 3 illustrates different detections of the object of FIG. 1 by the sensors of the vehicle.

The computer 110 may be programmed to determine objects based on a combination of object data received from the sensors 130A, 130B. However, e.g., due to differences in resolution, calibration, etc., first and second data received from first and second sensors 130A, 130B may not match, i.e., the first and second data can describe different attributes of a same ground truth, e.g., different locations and/or dimensions for an object 160. FIG. 3 illustrates that the computer 110 may determine a location and/or dimensions for the object 160 that differ from location (x, y, z) and/or dimension of the object 160. Location coordinates (x, y, z) of an object 160 may be coordinates of an object 160 reference point, e.g., a corner and/or any point on a contour of an object 160 that may be detected based on an image processing technique.

For example, based on radar sensor 130A data, the computer 110 may determine location coordinates ($x_R$, $y_R$) of a projection 340 of the object 160 on the horizontal image plane 210. Thus, the computer 110 may detect an object representation 330 at coordinates ($x_R$, $y_R$) instead of the object 160 at coordinates (x, y, z). In the present context, an "object representation" is data specifying an object 160 wherein at least some of the data, such as location, dimensions, etc., differ from ground truth data for object 160, and/or where the object representation 330 omits data corresponding to certain data to completely describe the object 160 (e.g., a height or Z component could be omitted). In one example, the computer 110 may be programmed to estimate an elevation $z_R$, e.g., based on a classified type of the object 160. For example, the computer 110 may estimate dimensions of the object 160 on the horizontal plane 210 based on the received radar image data, to classify the object 160, e.g., as a truck, and to estimate an elevation $z_R$ based on a predetermined height of a truck type object 160 stored in a computer 110 memory.

As illustrated in FIG. 3, based on camera sensor 130B data, the computer 110 may determine location coordinates ($y_c$, $z_c$) for a projection 320 of the object 160 on the vertical image plane 220. Thus, the computer 110 may detect an object representation 310 at coordinates ($y_c$, $z_c$) instead of the object 160 at coordinates (x, y, z). In one example, the computer 110 may be programmed to estimate a longitudinal coordinate $x_c$, e.g., 3D reconstruction techniques using a plurality of monocular image.

As further illustrated in FIG. 3, dimensions of the projections 320, 340 indicate a miscalculation of the dimensions of the physical object 160. For example, dimensions of the object 160 are different from the dimensions of the detected object projections 320, 330. Thus, by analyzing the radar sensor 130A data and camera sensor 130B data, the computer 110 may fail to determine that both object representations 310, 330 correspond to a same physical object 160.

Figure 4A:
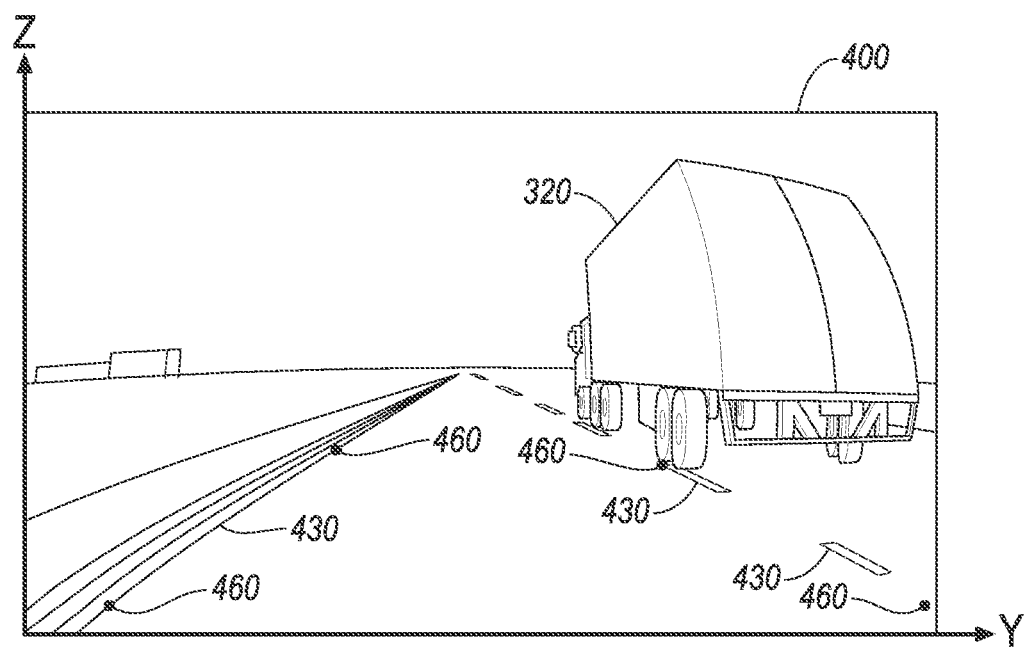
FIG. 4A illustrates a distorted camera image in Y-Z plane received from a vehicle camera sensor.
Figure 4B:
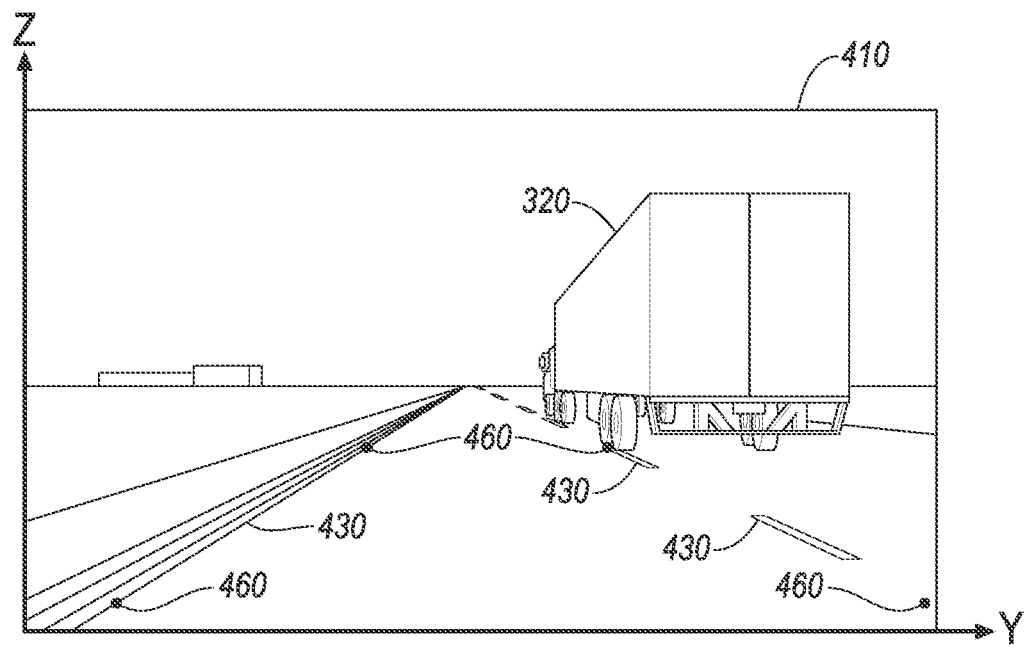
FIG. 4B illustrates an image resulted from undistorting the image of FIG. 4A.
Figure 4C:
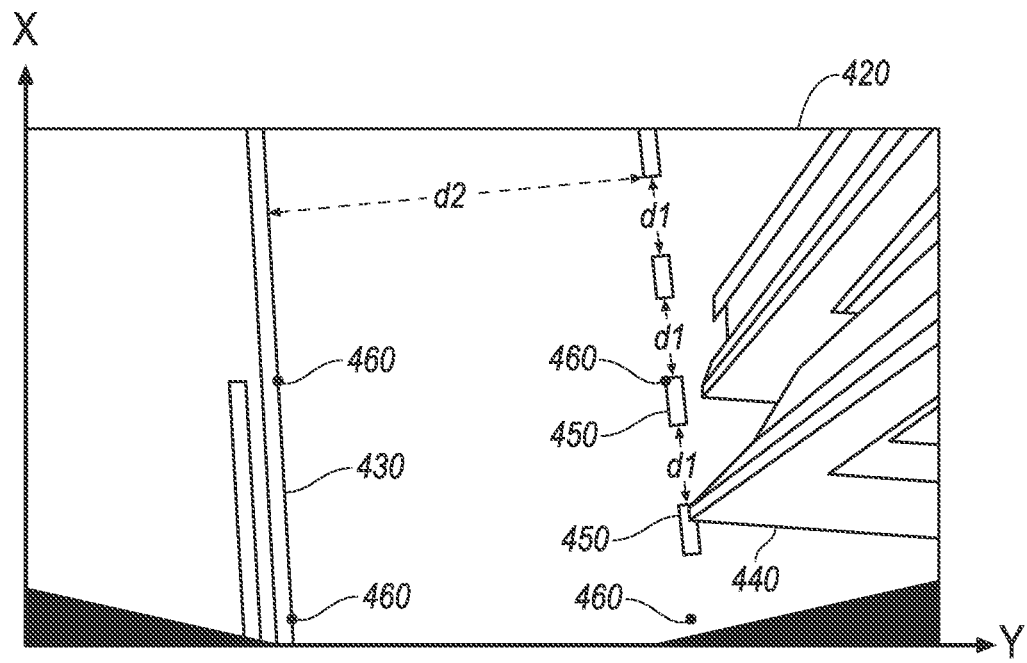
FIG. 4C illustrates the camera image of FIG. 4B transformed into X-Y plane.

In one example, the computer 110 can be programmed to receive a distorted vertical plane camera image 400 (FIG. 4A), to undistort the image 400, thereby generating an undistorted vertical plane image 410 (FIG. 4B), and transform the vertical image plane camera image 410 to the horizontal image plane 210, thereby generating a transformed camera image 420 (FIG. 4C). The computer 110 can be programmed to receive horizontal plane radar image 510 (FIG. 5A), and to generate a scaled horizontal image plane radar image 520 based on a resolution of the transformed camera image 420 (FIG. 5B), as discussed below. The computer 110 can be further programmed to then superimpose the scaled horizontal image plane radar image 520 on the transformed camera image 420 thereby generating a superimposed image 600 (FIG. 6), as discussed below. In the present context, to "scale" means to change a resolution of an image and to "rescale" means to adjust a resolution of a previously-scaled image, i.e., repeating a scaling step.

FIG. 4A shows the image 400 that is a representation of exemplary image data received from the camera sensor 130B. Typically, image data received from a camera sensor 130B is distorted or warped due to a design, e.g., shape, thickness, material, etc., of one or more camera lens that focus light beams received by the sensor 130B onto an imaging chip of the camera sensor 130B. Distortion is a deviation from rectilinear projection, i.e., a projection in which straight lines in a scene remain straight in an image. Although distortion can be irregular or follow various patterns, typically encountered distortions are radially symmetric arising from a symmetry of a lens. The radial distortions can usually be classified as barrel distortions, pincushion distortions, etc. The computer 110 may be programmed to dewarp (or undistort) the image 400 and to generate an undistorted image 410 (i.e., a rectilinear projection), as shown in FIG. 4B, e.g., based on an OpenCV instruction (1) or the like. Alternatively, the computer 110 may be programmed to receive undistorted image 410 from the camera sensor 130B, i.e., a camera sensor 130B may output undistorted image 410 data.

$$\text{undist}=cv2.\text{undistort}(img, mtx, dist, \text{None}, mtx) \quad (1)$$

Open CV is a library of programming functions that support real-time computer vision; see https://opencv.org/. Additionally or alternatively, the computer 110 may include chips and/or electronic circuits that undistort the image 400, e.g., by reading image 400 data from a computer 110 memory and storing a undistorted image 420 in the computer 110 memory. In instruction 1, which is an Open CV instruction, img represents distorted camera image 400 data; mtx represents camera 130B parameters including focal lengths and optical centers; and dist represents distortion coefficients including radial and tangential distortion coefficients of camera sensor 130B lens.

FIG. 4C illustrates the transformed camera image 420 that may result from transforming the undistorted vertical plane camera image 420 to the horizontal image plane 210. In the present context, "transforming to horizontal image plane" means changing a perspective of an image such that a viewer of the transformed image views the image from above the ground surface downwardly, e.g., along the vertical or Z axis in the exemplary coordinate system discussed herein. "Perspective" is a combination of a location and/or orientation of a viewer, a camera sensor, etc. As a result of a perspective transformation, an image is viewed from a different perspective, e.g., object 160 and a road with road markings 430 are viewed from different perspective in FIG. 4C compared to FIGS. 4A-4B.

In one example, the computer 110 may be programmed, e.g., based on OpenCV instruction (2), to compute a perspective transformation matrix M (or transformation matrix M) based on corresponding coordinates of a set of points 460 (e.g., edges of road markings 430 detected by an image processing technique), and to perform the transformation based on the determined matrix M. Ps represents a matrix including Y-Z coordinates of at least 3 points 460 in an input image, e.g., the image 410 in Y-Z plane 220. PD represents a matrix including X-Y coordinates of the points 460 in an output or transformed image, e.g., the image 420. M is a transformation matrix that is determined based on the instructions (2). The computer 110 may be programmed to perform the transformation based on the transformation matrix M.

$$M=cv2.\text{getPerspectiveTransform}(P_S, P_D) \quad (2)$$

As discussed above, the computer 110 may determine the transformation matrix M upon receiving an image 400 that includes a predetermined set of image data, e.g., markings 430. A very first (i.e., temporally first) image 400 received from the camera sensor 130B that includes the predetermined type of images, e.g., road markings 430, is herein referred to as the first image 410. Upon receiving the first image 410 with the predetermined image data, the computer 110 may be programmed to determine the transformation matrix M and to generate the transformed image 420. After determining the transformation matrix M, the computer 110 may be programmed to fine tune the transformation matrix M based on image 410 data received during an operation of the vehicle including a wall, light pole, building, guard rail, etc. Thus, the computer 110 may determine other known real-world dimensions, e.g., a height of a light pole height, in the received image 410 and fine tune the transformation matrix M.

In the present context, "fine tuning" means applying minor adjustment to an existing value, e.g., fine tuning resolution, transformation matrix M, etc. For example, a fine tuning may include an adjustment of maximum 3% greater or less than previous parameter value. As discussed with reference to FIGS. 8A-8C, the transformation matrix M may be adjusted during an operation of the vehicle 100 computer 110 based on camera and radar data received from the camera and radar sensors 130A, 130B.

In the present context, road markings 430 are examples of a pattern based on which the resolution $K_C$ of the camera images 420 can be determined or fine-tuned, as discussed above. Such patterns have typically real-world dimensions that are known to the computer 110, e.g., stored in the computer 110 memory. Examples of patterns include parking space markings, road markings 430, etc.

As shown in FIG. 4C, the transformed camera image 420 includes flaws (or blemishes), e.g., with respect to the object 160. The object 160 in this example is a truck. Based on a field of view of the vehicle 100 camera sensor 130B, the camera image 400 may lack image data from, e.g., a top surface of the truck. Thus, the transformed camera image 420 may include flaws because of lack of information for a top view perspective.

In the present context, a camera image 420 resolution includes a longitudinal resolution $K_{Cx}$ (i.e., along the X axis) and a lateral resolution $K_{Cy}$ (i.e., along the Y axis). For example, the camera image resolution $K_C$ may be specified as a vector such as shown in Equation (3). In other words, the resolution $K_C$ specifies how many units of real-world distance is covered by a pixel of the image 420 in either of the directions of the X and Y axes. Real-world distance, herein, refers to a distance in the physical world, e.g., a distance $d_1$, $d_2$ specified in centimeters (cm), between two road markings 430. The computer 110 may determine the distances $d_1$, debased on data stored in a computer 110 memory. The distances $d_1$, $d_2$ may be determined based on a location of the vehicle 100. For example, the distance $d_2$ may be 3.7 meters (m) in the United States and 3.25 m in Europe.

$$K_C = \begin{bmatrix} K_{Cx} \\ K_{Cy} \end{bmatrix} \tag{3}$$

In order to determine a resolution $K_C$ of the transformed camera image 420, the computer 110 may be programmed to detect, in the transformed camera image 420, two or more road markings 450, to determine a number of pixels between the detected road markings 450 in the transformed image 420v, and to determine the resolution $K_C$ of the camera 130B image based on a real-world distance $d_1$, $d_2$ of the detected road markings 450 and the determined number of pixels $n_1$, $n_2$ between the detected road markings 450 in the transformed camera image 420. For example, the computer 110 may be programmed to determine the resolution $K_C$ based on equations (4)-(5). Additionally or alternatively, the computer 110 may be programmed to receive the camera resolution $K_C$ from a computer 110 memory or a remote computer. A resolution $K_{Cx}$, $K_{Cy}$ may be specified in centimeter (cm) per pixel. For example, $K_{Cx}=20$ cm/pixel means, with respect to the transformed image 420, each pixel length corresponds to 20 cm along X axis in real-world. As another example, $K_{Cy}=25$ cm/pixel means each pixel width corresponds to 25 cm along the Y axis in the real, i.e., physical, world.

$$K_{Cx} = \frac{d_1}{n_1} \tag{4}$$

$$K_{Cy} = \frac{d_2}{n_2} \tag{5}$$

Additionally or alternatively, upon an initial determination of the camera resolution $K_C$ (e.g., based on road markings 430 as discussed above), the camera resolution $K_C$ may be iteratively fine-tuned during an operation of the vehicle 100 computer 110 based on image data received from different scenes, e.g., parking area, intersection, freeway, road, etc. In the present context, "fine-tuning" means further modifications of a value after determining an initial value (based on the first image 400) which is substantially accurate, e.g., having 10% inaccuracy. For example, the computer 110 may be programmed to detect objects 160 such as light poles, traffic signs, cars, road marking 430, guard rail, etc., and to fine-tune the resolution $K_C$ based on the received image data.

Figure 5A:
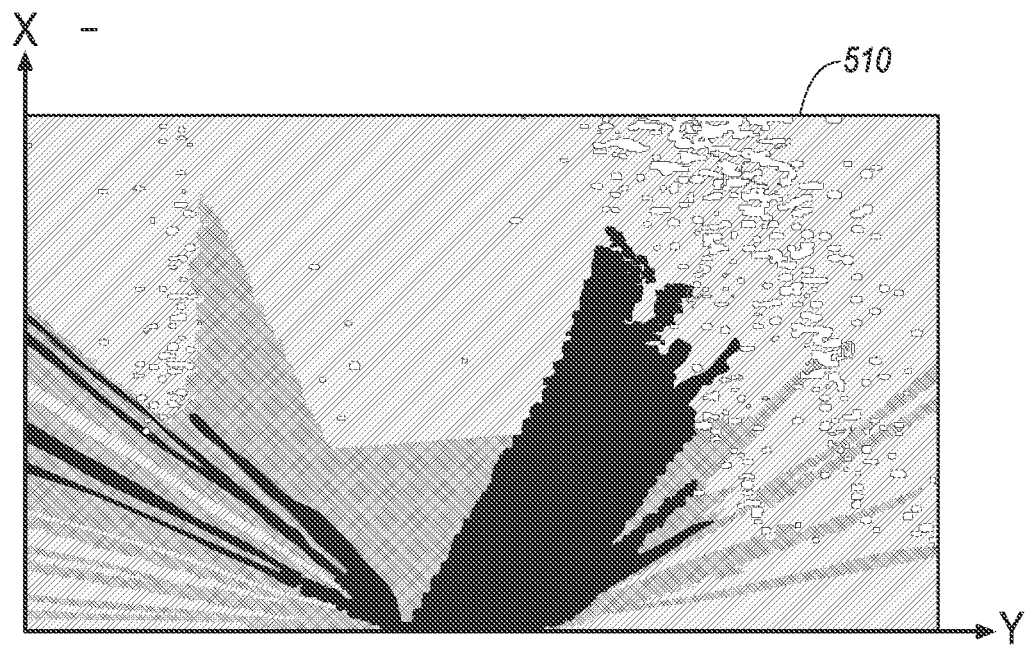
FIG. 5A illustrates radar image in X-Y plane.
Figure 5B:
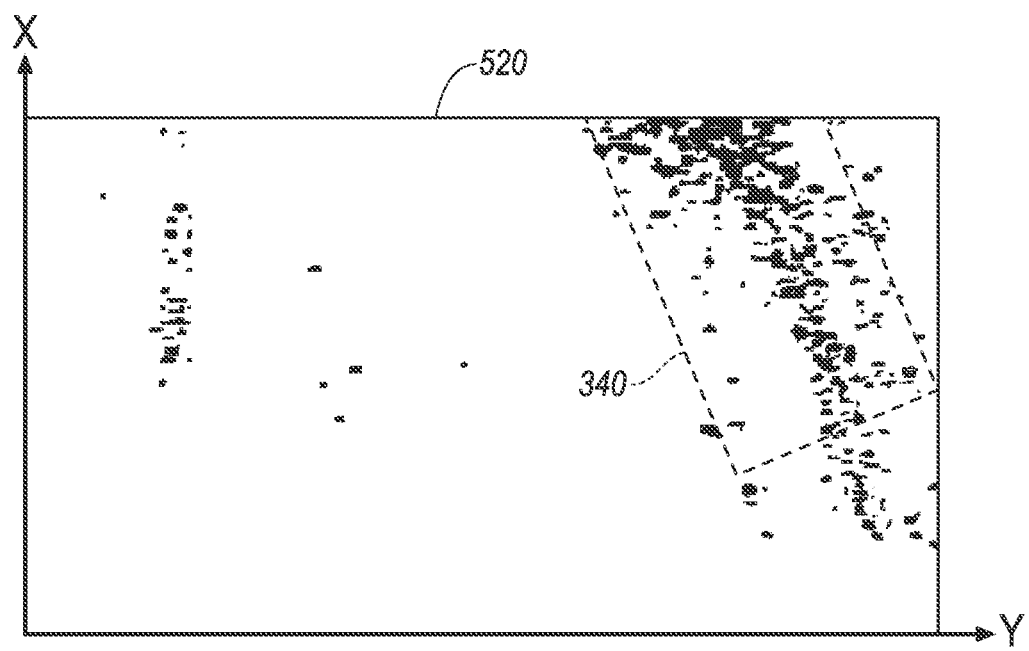
FIG. 5B illustrates an occupancy grid map of radar image of FIG. 5A.

FIG. 5A shows a radar image 510 in X-Y plane 210 which is a graphical representation of radar data received from the radar sensor 130A. As discussed above, a radar sensor 130A typically provides data in the X-Y plane 210. The computer 110 may be programmed to generate an occupancy grid map (or grid map image 520) based on the received radar image 510. A grid map 520 includes multiple cells. Each cell includes information regarding presence of an object in the respective cell of the grid map image 520. A cell may include one or more pixels. An occupancy of a cell, i.e., whether an object 160 or part of an object 160 is detected in the cell, may be specified by a binary value, e.g., 0 (no object detected or unoccupied) shown with white color, 1 (object present or occupied) shown with dark color. The computer 110 may be programmed to determine an occupancy value to be 1 upon determining that a number of reflections from within boundaries of an area corresponding to the cell exceeds a threshold, e.g., 5 reflections.

The computer 110 may be programmed to detect an object 160 based on a grid map image 520 using image processing techniques. For example, the computer 110 may detect the object 160 based on identifying the projection 340 (an area with occupied cells). Thus, the computer 110 may determine a classification, e.g., car, truck, bike, building, light pole, corner reflectors, etc., for the object 160 in the projection 340 based on a shape, size, etc., of the projection 340 area (e.g., a bounding box around the occupied area).

A radar image 510 resolution includes a longitudinal resolution $K_{Rx}$ (i.e., along the X axis) and a lateral resolution $K_{Ry}$ (i.e., along the Y axis). The longitudinal and lateral resolutions $K_{Rx}$, $K_{Ry}$ may be specified in centimeter per pixel (cm/pixel). For example, the radar image resolution $K_R$ may be specified as a vector such the vector in Equation (3) that specifies a camera resolution $K_C$. The radar image 510 and the transformed camera image 420 are in the X-Y plane 210; however, a radar image resolution $K_R$ of the radar image 510 may differ from the resolution $K_C$ of the transformed camera image 420. The resolution $K_R$ may be based on physical characteristics of the radar sensor 130A such as a frequency, a magnetic field of the radar sensor 130A antenna, etc. In other words, real-world dimensions corresponding to each pixel of the image 520 typically differ from real-world dimensions corresponding to each pixel of the image 420.

A field of view of a radar sensor 130A may differ from a field of view of a camera sensor 130B. In one example, the computer 110 may be programmed to crop the radar grid map image 520 based on an overlap of fields of view of the camera and image data and to generate the radar image 520 from the cropped radar image 510. In the present example, "cropping" includes removing a section of the image 510 along the X and/or Y axis (or axes) to obtain a field of view that is substantially the same as an overlapping field of view of the radar and camera sensors 130A, 130B.

The computer 110 may be programmed to generate a scaled radar image 520 based on the resolution $K_C$ of transformed camera image 420 and the resolution $K_R$ of radar image 510. For example, the computer 110 may be programmed to scale the radar image 510 by applying a multiplying factor $K_C/K_R$ to dimensions of the image 520. Thus, a resolution $K_{R'}$ of the scaled radar image 510 (or scaled grid map 520) is equal the resolution $K_C$ of the camera image 420. As discussed above, the camera resolution $K_C$ may be fine-tuned. Thus, the computer 110 may be programmed to rescale the radar image 510 based on determining that the camera resolution $K_C$ is fine-tuned. In other words, as the camera resolution $K_C$ changes, the computer 110 may be programmed to maintain a same resolution $K_{R'}$ for the scaled radar image 510 as the fine-tuned camera image resolution $K_C$.

As discussed above, the computer 110 may be programmed to determine an overlapping field of view of the transformed camera image 420 and radar image 510 and to scale the radar grid map image 520 to have a same resolution $K_{R'}$ as the transformed camera image 420 resolution $K_C$. Thus, the scaled radar grid map image 520 may have substantially same dimensions as the transformed camera image 420. The transformed images 420 and scaled grid map image 520 are in the X-Y plane 210. Thus, in this context, image dimensions, which may be defined by numbers of pixels, refer to image dimensions along X and Y axes. A relationship between image dimensions in pixels to real-world dimensions along X and Y axes can be determined based on, e.g., the longitudinal and lateral resolutions $K_{Cx}$, $K_{Cy}$ included in matrix $K_C$.

As discussed above with reference to FIG. 3, the location, dimensions, and/or shape of projections 320, 340 as received from the camera and radar sensors 130A, 130B may be different. The computer 110 may be programmed to detect an object 160 (e.g., based on an object 160 projection 320) in the camera image data, to identify a first location ($x_C$, $y_C$) of the detected object 160 in the transformed camera image 420, to identify a second location ($x_R$, $y_R$) of the detected object 160 in the radar image 520, and to retransform the scaled radar image 520 to superimpose the first location ($x_c$, $y_c$) of the object 160 in the radar image 420 on the second location ($x_R$, $y_R$) of the object 160 in the transformed camera image 420. To "superimpose" means to place an image on or over, i.e., to overlay the image on, another image so pixels from both appear in the resulting, i.e., superimposed, image, although pixels from one image may block or obscure pixels from the other image ((or vice versa), e.g., by placing dark color pixels of image 520 on image 420 while discarding white color pixels of image 520, as was done to produce the example image 600 of FIG. 6.

In the present context, "retransforming" is determining an adjusted transformation matrix $M_a$ for transforming the vertical plane camera image 410 to horizontal plane image 420 such that the projection 440 of the object 160 in image 420 is at the second location ($x_R$, $y_R$) instead of the first location ($x_c$, $y_c$). For example, the computer 110 may be programmed to determine an adjusted destination matrix $P_{Da}$ based on the second location ($x_R$, $y_R$) (i.e., replacing the location coordinates ($x_c$, $y_c$) in the matrix $P_D$ with location coordinates ($x_R$, $y_R$) thereby generating the matrix $P_{Da}$) and to compute the adjusted transformation matrix $M_a$ based on instruction (6). Thus, the computer 110 may determine an adjusted transformation matrix $M_a$ to align projections 440, 340 produced based on radar and camera data. In the present context, to "align" means reducing a longitudinal and/or lateral error $E_x$, $E_y$ between location of projections 440, 340 in the superimposed image to less than an error threshold $Th_x$, $Th_y$. An "alignment" is achieved when the longitudinal and/or lateral error $E_x$, $E_y$ are less than the thresholds $Th_x$, $Th_y$.

$$M_a = cv2.\text{getPerspectiveTransform}(P_S, P_{Da}) \quad (6)$$

In one example, a longitudinal and a lateral error $E_x$, $E_y$ may be determined based on equations (7)-(8) which defines an error $E_x$, $E_y$ to be an absolute difference between each of the X and Y coordinates determined based on camera and radar data. The computer 110 may be programmed to perform a retransformation of the camera image 410 upon determining that at least one of the longitudinal and lateral errors $E_x$, $E_y$ exceeds a corresponding longitudinal and lateral error threshold $Th_x$, $Th_y$. The computer 110 may be programmed based on Equations (9)-(10) to determine the thresholds $Th_x$, $Th_y$, e.g., specified in units of meter (m), centimeter (cm), etc. Parameters $a_1$, $a_2$ may be constant numbers greater than or equal 1. For example, $a_1 = a_2 = 1.1$.

$$E_x = |x_R - x_C| \quad (7)$$

$$E_y = |y_R - y_C| \quad (8)$$

$$Th_x = a_1 * \max(K_{Cx}, K_{Rx}) \quad (9)$$

$$Th_y = a_2 * \max(K_{Cy}, K_{Ry}) \quad (10)$$

Upon retransformation of the camera image 410, i.e., generating a retransformed camera image 420 using the adjusted transformation matrix $M_a$ and the camera image 410, the computer 110 may be programmed to update the superimposed image 600, i.e., to superimpose the scaled radar grid map image 520 on the retransformed camera image 420. The retransformation advantageously can result in a reduction of errors $E_x$, $E_y$. A retransformation of the camera image 420 may be performed one or more times, e.g., as the vehicle 100 moves along a route and different scenes are viewed by the camera sensor 130B, to achieve an alignment. Additionally or alternatively, retransformation may be performed multiple times on a same scene, e.g., using different reference points 460 of various objects 160 detected in a scene. Thus, performing a retransformation may depend on what objects and/or features of objects are viewed by the camera 130B, e.g., edges or contours of a guard rail, parking space marking, light pole, etc.

The computer 110 may be programmed to determine that the object(s) 160 projections 340, 440 in the superimposed image 600 are aligned upon determining that a longitudinal and lateral error $E_x$, $E_y$ between projections 340, 440 in the superimposed image 600 are less than corresponding longitudinal and lateral error thresholds $Th_x$, $Th_y$. In other words, the projections 340, 440 of a reference point such as a corner of the object 160 in the superimposed image 600 have substantially same coordinates. "Substantially same coordinates" means that Error $E_x$, $E_y$ is less than respective threshold $Th_x$, $Th_y$.

Typically, objects 160 with contours, corners, and/or geometrical shapes, etc., can be helpful in aligning the camera and radar data, e.g., because an edge detection technique may reliably detect such shapes, corners, etc. In one example, a list of suitable objects 160 and/or patterns for alignment, e.g., wall, guard rail, light pole, vehicle, truck, parking space marking, road marking 430, etc., may be stored in a computer 110 memory. A suitable object 160 and/or pattern is an object 160 or pattern with known real-world dimensions. The list may include real-world dimensions data that can be utilized by the computer 110 to align the camera and radar data. Such real-world dimensions data may include a length of a guard rail, a lane width, dimensions of parking spaces, etc., that may be specified based on standards, norms, etc.

Figure 6:
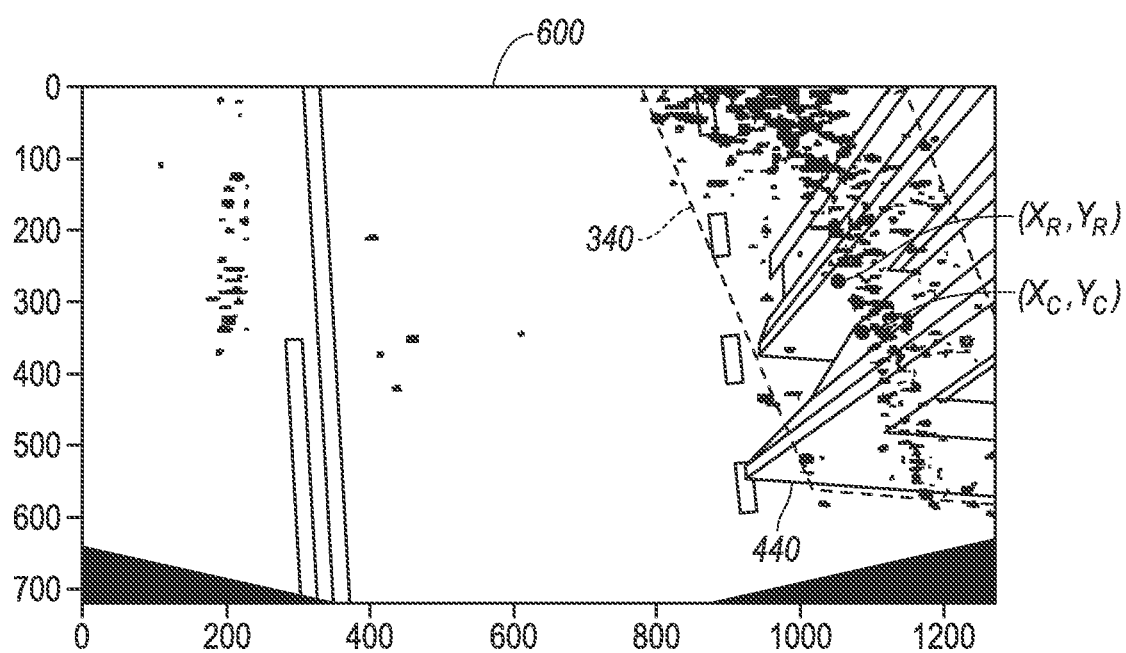
FIG. 6 illustrates the radar grid map of FIG. 5B superimposed on the transformed camera image of FIG. 4B.

As discussed above, the dimensions of the scaled grid map image 520 and the transformed camera image 420 may be the same based on cropping an overlapping field of view and scaling as discussed above. Thus, the computer 110 may be programmed to superimpose the scaled radar grid map image 520 on the transformed camera image 420 by aligning at least two corners, e.g., top right and bottom left corners, of the images 420, 520. As discussed above, superimposing may include placing an image on another such that pixels from both images are represented together. For example, as shown in FIG. 6, the computer 110 may be programmed to place the occupied cells of the scaled grid map image 520 on the transformed image 420. The computer 110 may be programmed to discard the unoccupied cells (i.e., not placing the white color section of the image 520 on the image 420 which permits the camera image data to be evident in the image 600).

Figure 7:
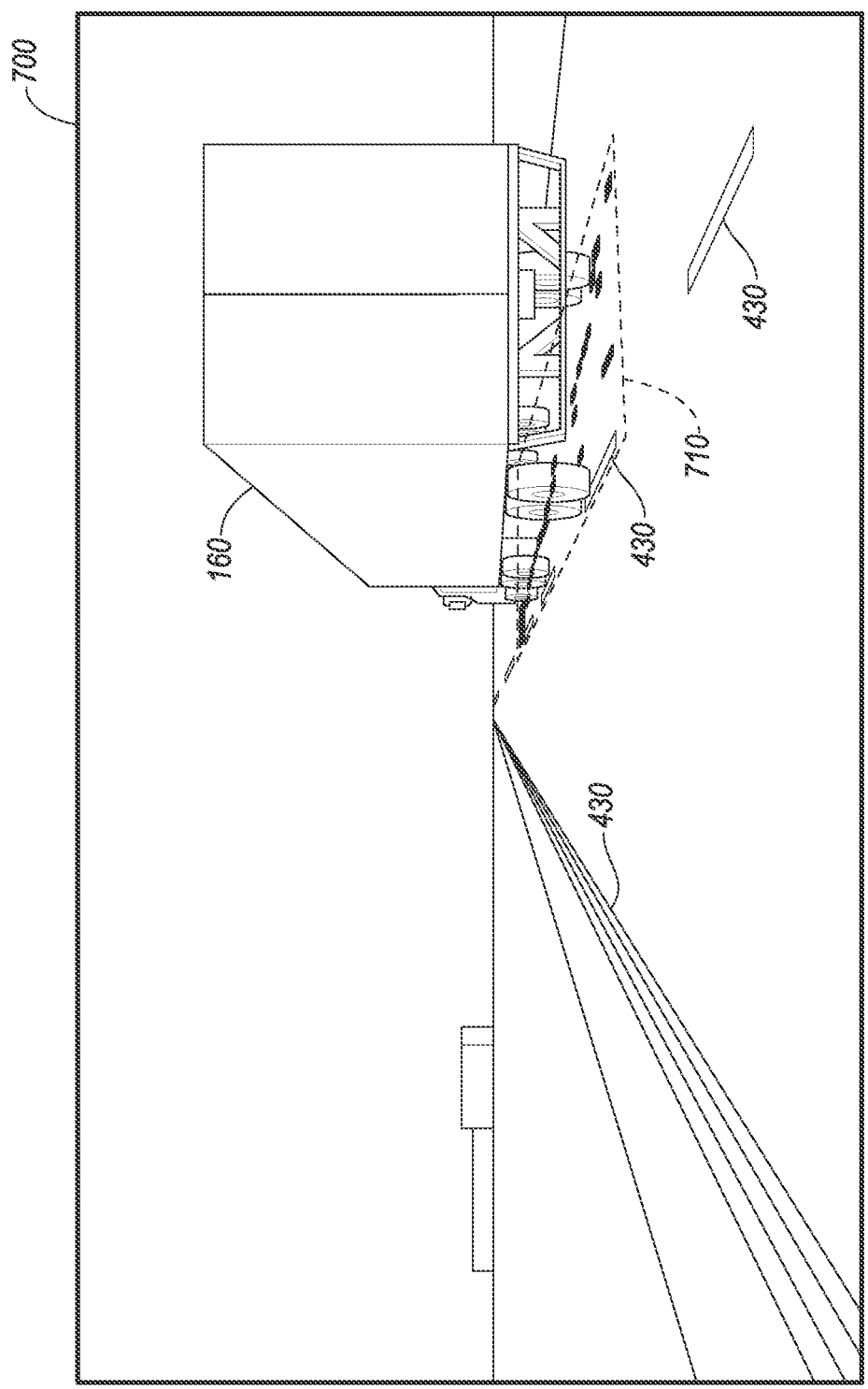
FIG. 7 illustrates a transformation of FIG. 6 from X-Y plane to Y-Z plane.

To detect object 160 based on vertical plane 220 image data, the computer 110 may be programmed to determine an inverse transform transformation matrix $M_{inv}$, e.g., based on Equation (11), that transforms the horizontal plane superimposed image 600 to the vertical image plane 220, thereby generating a vertical image plane superimposed image 700, as shown in FIG. 7, that includes the depth data of radar images 510, e.g., the longitudinal coordinates x of object(s) 160. The computer 110 may be programmed, in accordance with instruction (12), to generate a superimposed vertical plane image 700 from the superimposed image 600, e.g., using OpenCV techniques, Matlab®, etc. INTER_LINEAR represents an interpolation method. Alternatively, other interpolation methods can be used such as INTER_NEAREST, etc.

$$M_{inv}=\text{inverse}(M) \quad (11)$$

$$ImgVer=cv2.\text{warpPerspectiveTransform}(ImgHor, M_{inv}, ImgHor, \text{flags}=cv2.\text{INTER\_LINEAR}) \quad (12)$$

For example, the image 700 data ImgVer may include a longitudinal coordinate x of each pixel stored in the image data ImgVer. The computer 110 may be programmed to determine the longitudinal distance x to a reference point of the object 160 by identifying the object 160 in the vertical superimposed image 700, identifying the reference point of the object 160, e.g., a corner, etc., and then determining the longitudinal coordinate x of the reference point based on data stored in the image data ImgVer. Alternatively, the computer 110 may be programmed to transform the grid map image 520 to the vertical image plane 220 thereby generating a transformed projection 710 (i.e., a vertical image plane 220 radar grid map image projection), and then to superimpose the vertical plane radar image projection 710 on the vertical plane camera image 420.

Figure 8A:
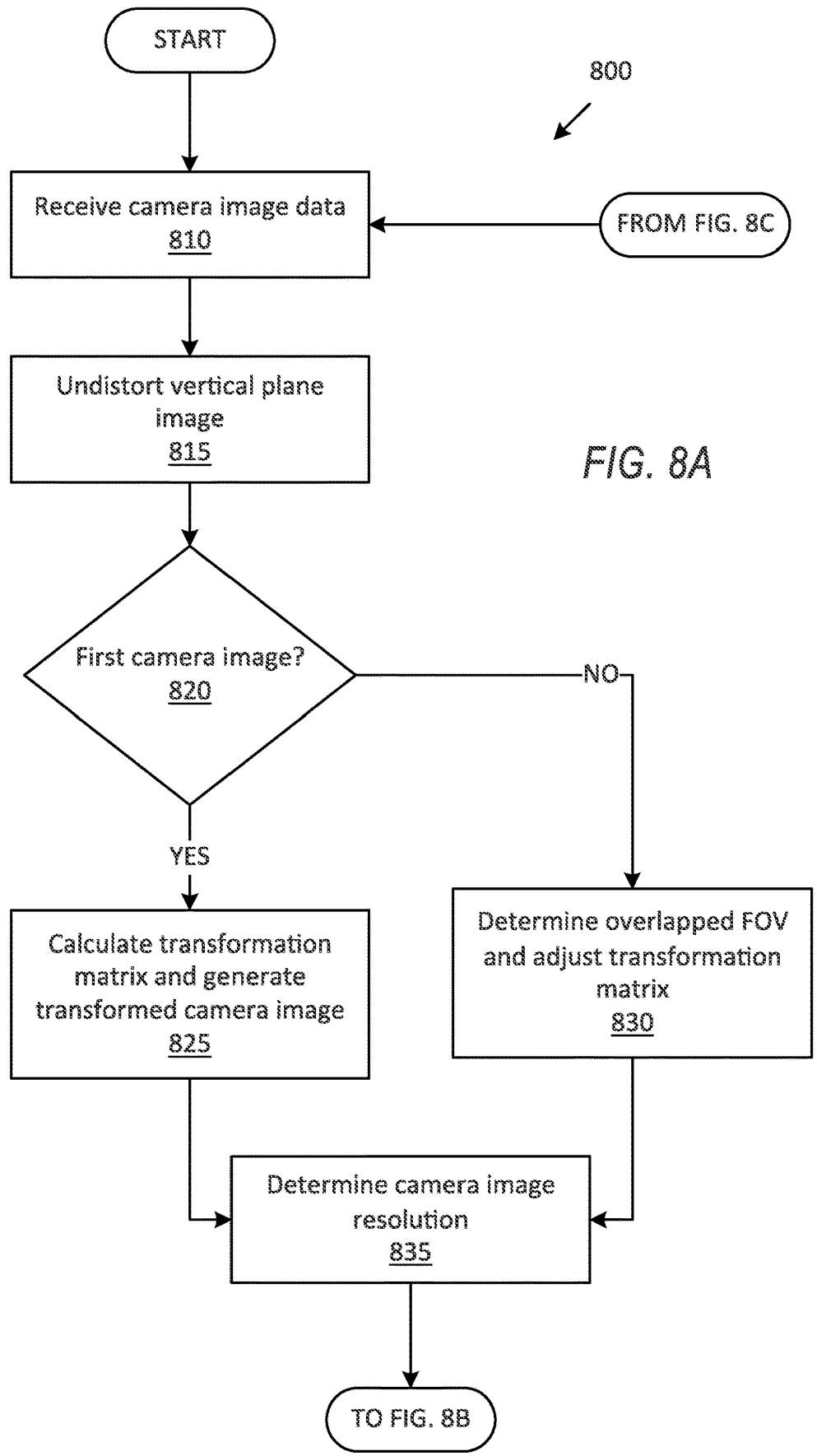
Figure 8B:
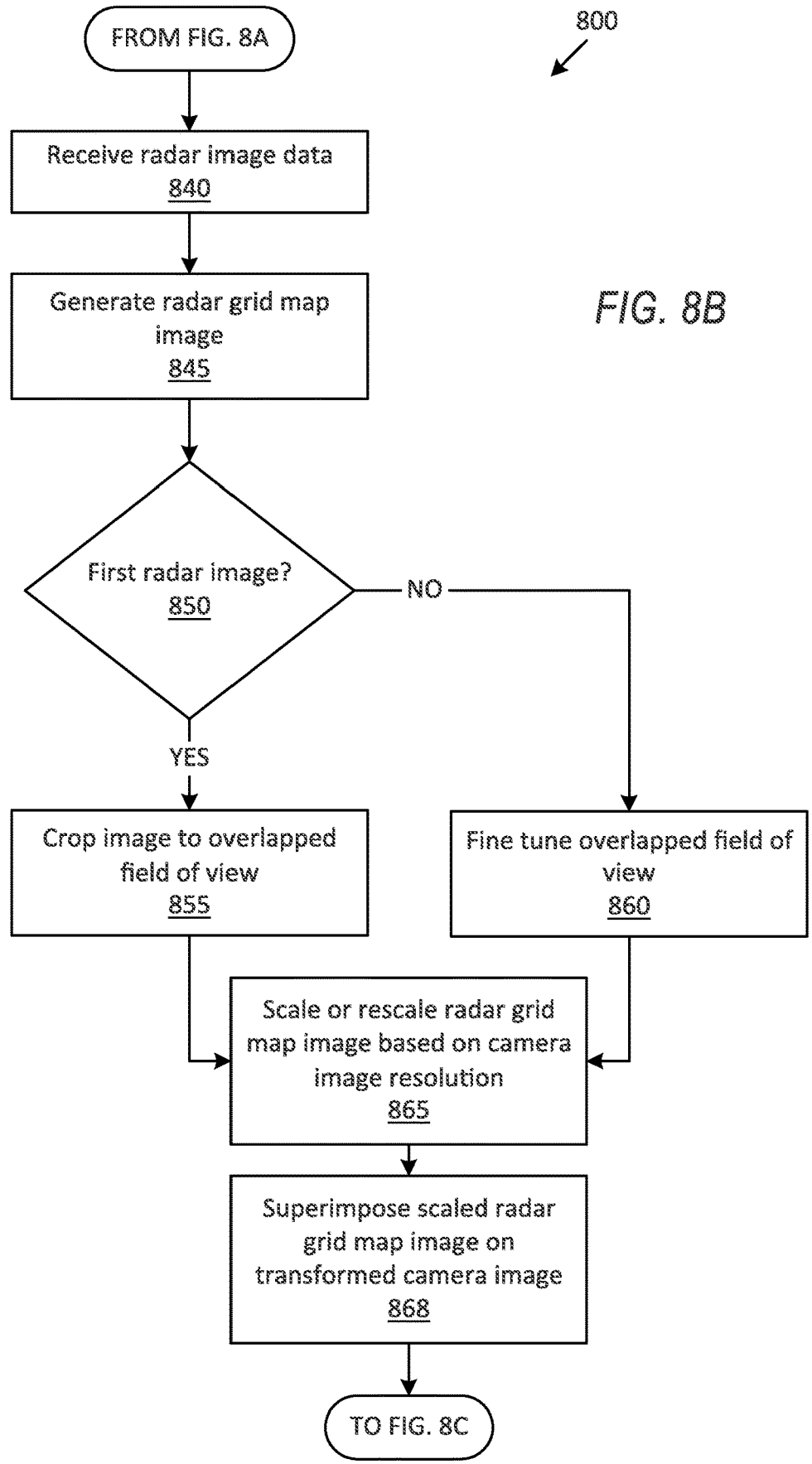

FIGS. 8A-8C show an exemplary flowchart of a process 800 for operating a vehicle 100 based on data received from vehicle 100 camera and radar sensors 130A, 130B. The computer 110 may be programmed to execute one or more blocks of the process 800. Although the process 800 is illustrated sequentially, at least some blocks of the process 800 may be executed in parallel, i.e., at substantially a same time, e.g., blocks 840-868 may be executed in parallel to blocks 810-835. In other words, camera image processing may be performed in parallel to radar image processing, e.g., in a multi-processor computer 110.

With reference to FIG. 8A, the process 800 begins in a block 810 in which the computer 110 receives image data. For example, the computer 110 may be programmed to receive image 400 data from a vehicle 100 forward-looking camera 130B.

Next, in a block 815, the computer 110 undistorts the distorted image 400, e.g., thereby generating the undistorted image 410. The computer 110 may be programmed based on instruction (1) to generate the undistorted image 410.

Next, in a decision block 820, the computer 110 determines whether the received image 400 is a "first (i.e., temporally first) image" received from the camera sensor 130B. If the computer 110 determines that the received image 400 is the first image 400 received from the camera sensor 130B, then the process 800 proceeds to a block 825; otherwise the process 800 proceeds to a block 830.

In the block 825, the computer 110 determines the transformation matrix M for the first camera image 410 (as discussed above, first image 410 including predetermined image data such as the road markings 430). In one example, the computer 110 may determine the transformation matrix M based on data stored in the computer 110 memory.

In the block 830, the computer 110 determines the overlapping field of view, determines an adjusted transformation matrix $M_a$ based on the received image 400 data from a scene such as a parking area, guard rail, wall, road, etc. The computer 110 may be programmed to determine the overlapping field of view further based on received radar image 510 and the camera image 400 (or the transformed camera image 420). The computer 110 may be programmed to generate the transformed camera image 420 based on the transformation matrix $M_a$.

Following each of the blocks 825, 830, in a block 835, the computer 110 determines the camera image resolution $K_C$ of the transformed camera image 420. As discussed above, the resolution matrix $K_C$ includes a longitudinal and a lateral resolution $K_{Cx}$, $K_{Cy}$.

Next, as shown in FIG. 8B, which continues the illustration of the process 800, in a block 840, the computer 110 receives radar image data, e.g., image 510.

Next, in a block 845, the computer 110 generates a radar grid map image 520 based on the received radar image 510. For example, the computer 110 may be programmed to generate an occupancy grid map image 520, as discussed above.

Next, in a decision block 850, the computer 110 determines whether the received radar image 510 is a first (i.e., temporally first) received radar image 510. For example, the computer 110 may be programmed to determine that the received radar image 510 is the first radar image 510 upon determining that the computer 110 received the first camera image 400 including road markings 450, as discussed above. If the computer 110 determines that the first radar image 510 is received, then the process 800 proceeds to a block 855; otherwise the process 800 proceeds to a block 860.

In the block 855, the computer 110 crops the received radar image 520 to the overlapping field of view of the transformed camera image 420. Alternatively, cropping may be performed on the radar image 510, i.e., prior to generating the radar grid map image 520.

In the block 860, the computer 110 fine tunes the field of view of the radar grid map image 520 based on the received transferred camera image 420.

Following either of the blocks 855, 860, next, in a block 865, the computer 110 scales or rescales the radar grid map image 520 based on the camera resolution matrix $K_C$. The computer 110 may be programmed to scale a first radar grid map image 520 or to rescale other radar grid map images 520.

Next, in a block 868, the computer 110 superimpose the scaled radar grid map image 520 on the transformed camera image 420. For example, the computer 110 generates the superimposed image 600.

Next, as shown in FIG. 8C, in a decision block 870, the computer 110 determines whether an object 160 such as wall, guard rail, car, truck, light pole, etc., and/or a pattern such as road marking 430, etc., is detected in the overlapping field of view of the radar and camera sensors 130A, 130B.

As discussed above, the computer 110 may be programmed to determine the resolution of the camera image 420 from patterns such as road markings 430. Thus, the first image 420 as discussed above, may include a pattern such as the road marking, etc. The computer 110 may be programmed to detect an object 160 such as a vehicle(s) on a road, wall, guard rail, vehicles in a parking area, light pole, traffic sign, etc., and/or patterns such as road marking(s) 430, using image processing techniques. If the computer 110 detects an object 160 and/or pattern, then the process 800 proceeds to a block 875; otherwise the process 800 proceeds to the block 810, as shown in FIG. 8A, or alternatively proceeds to a block 860, although not shown in FIG. 8C.

In the block 875, the computer 110 determines the longitudinal and lateral errors $E_x$, $E_y$ based on the location coordinates of the object 160 in the scaled grid map image 520 and the transformed camera image 420. The computer 110 may be programmed based on Equations (7)-(8) to determine the longitudinal and lateral errors $E_x$, $E_y$.

Next, in a decision block 880, the computer 110 determines whether the object(s) 160 in the superimposed image 600 are aligned. The computer 110 may be programmed to determine whether the object(s) projections 340, 440 are aligned upon determining that the errors $E_x$, $E_y$ are less than corresponding longitudinal and lateral error threshold $Th_x$, $Th_y$. If the computer 110 determines that the camera and radar data are aligned, then the process 800 proceeds to a block 895; otherwise the process 800 proceeds to a block 882.

In the block 882, the computer 110 determines an adjusted transformation matrix $M_a$ to align the camera and radar image data. The computer 110 may be programmed to determine the adjusted transformation matrix $M_a$ according to instruction (6). The computer 110 may be programmed to retransform the camera image 410 using the adjusted transformation matrix $M_a$, i.e., updating the transformed camera image 420 using the adjusted transformation matrix $M_a$.

Next, in a block 885, the computer 110 superimposes the scaled radar grid map image 520 on the retransformed camera image 420 generated by using the adjusted transformation matrix $M_a$ and updates the superimposed horizontal plane image 600. The computer 110 may be further programmed to update the longitudinal and lateral errors $E_x$, $E_y$ from the updated superimposed image 600. Thus, the computer 110 may be programmed to determine longitudinal and lateral errors $E_x$, $E_y$ from the retransformed camera image 420 and the scaled radar grid map image 520. Following the block 885, the process 800 returns to the decision block 880.

In the block 895, the computer 110 determines an inverse transformation matrix $M_{inv}$, e.g., based on Equation (11), to transform the horizontal plane superimposed image 600 to a vertical plane superimposed image 700.

Next, in a block 900, the computer 110 generates a superimposed vertical plane image 700 based on the horizontal superimposed image 600. The computer 110 may be programmed in accordance with instruction (12) to generate the image 700 data ImgVer from the image 600 data ImgHor and by using the inverse transformation matrix $M_a$.

Next, in a block 905, the computer 110 may be programmed to determine a longitudinal coordinate x of the object 160 from the vertical superimposed image 700 data.

Next, in a block 910, the computer 110 operates the vehicle 100. For example, the computer 110 may be programmed to actuate a vehicle 100 braking, steering, and/or propulsion actuator 120 based on the detected object(s) 160. For example, the computer 110 may be programmed to determine a distance from the vehicle 100 to an object 160 such as a second vehicle along the longitudinal coordinate x of the object 160 and actuate a vehicle 100 actuator 120 based on the determined longitudinal coordinate x of the object 160.

Following the block 910, the process 800 ends, or alternatively, returns to the block 810, although not shown in FIGS. 8A-8C.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

"Based on" encompasses "based wholly or partly on." If, herein, a first thing is described and/or claimed as being "based on" the second thing, then the first thing is derived or calculated from the second thing, and/or output from an algorithm, process, or program function that accepts some or all of the second thing as input and outputs some or all of the first thing.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer that includes a processor and a memory, the memory storing instructions executable by the processor such that the computer is programmed to:
   transform a vertical image plane camera image to a horizontal image plane, thereby generating a transformed camera image;
   generate a scaled horizontal image plane radar image based on a resolution of the transformed camera image;
   then superimpose the scaled radar image on the transformed camera image thereby generating a horizontal image plane superimposed image; and
   determine an inverse transform function that transforms the horizontal image plane superimposed image to the vertical image plane, thereby generating a vertical image plane superimposed image that includes longitudinal coordinates of objects.

2. The system of claim 1, wherein the instructions further include instructions to generate the scaled radar image further based on an occupancy grid map image extracted from received radar image.

3. The system of claim 1, wherein the instructions further include instructions to:
   detect an object in the camera image;
   identify a first location of the detected object in the transformed camera image;
   identify a second location of the detected object in the radar image; and
   rescale the scaled radar image to superimpose the first location of the object in the radar image on the second location of the object in the transformed camera image.

4. The system of claim 1, wherein the instructions to generate the vertical image plane superimposed image further include:
   applying the inverse transform function to the radar image thereby generating a vertical image plane radar image; and
   superimposing the vertical image plane radar image on the vertical plane camera image.

5. The system of claim 1, wherein the instructions further include instructions to:
   detect, in the transformed camera image, two or more road markings;
   determine a number of pixels between the detected two or more road markings in the transformed image; and
   determine the resolution of the camera image based on a real-world distance of the detected two or more road markings and the determined number of pixels between the detected road markings in the transformed image.

6. The system of claim 1, wherein the instructions further include instructions to crop the radar image based on an overlapping of fields of view of the camera and image data and generate the scaled radar image from the cropped radar image.

7. The system of claim 1, wherein the vertical image plane camera image is distorted and the instructions further include instructions to undistort the camera image prior to transforming the camera image to the horizontal image plane.

8. The system of claim 5, wherein the instructions further include instructions to determine the resolution of the camera image based on real-world dimensions of at least one of a guard rail, light pole, traffic sign, and wall, detected in the transformed camera image.

9. A system, comprising:
   a radar sensor with a first field of view and a camera sensor with a second field of view, wherein the first and second fields of view at least partially overlap; and
   a computer programmed to:
   transform a vertical image plane camera image to a horizontal image plane, thereby generating a transformed camera image;
   generate a scaled horizontal image plane radar image based on a resolution of the transformed camera image;
   then superimpose the scaled radar image on the transformed camera image thereby generating a horizontal image plane superimposed image; and
   determine an inverse transform function that transforms the horizontal image plane superimposed image to the vertical image plane, thereby generating a vertical image plane superimposed image that includes longitudinal coordinates of objects.

10. A method, comprising:
    transforming a vertical image plane camera image to a horizontal image plane, thereby generating a transformed camera image;
    generating a scaled horizontal image plane radar image based on a resolution of the transformed camera image;
    then superimposing the scaled radar image on the transformed camera image thereby generating a horizontal image plane superimposed image; and
    determining an inverse transform function that transforms the horizontal image plane superimposed image to the vertical image plane, thereby generating a vertical image plane superimposed image that includes longitudinal coordinates of objects.

11. The method of claim 10, further comprising generating the scaled radar image further based on an occupancy grid map image extracted from received radar image.

12. The method of claim 10, further comprising:
    detecting an object in the camera image;
    identifying a first location of the detected object in the transformed camera image;
    identifying a second location of the detected object in the radar image;

and rescaling the scaled radar image to superimpose the first location of the object in the radar image on the second location of the object in the transformed camera image.

13. The method of claim 10, wherein generating the vertical image plane superimposed image further includes:
applying the inverse transform function to the radar image thereby generating a vertical image plane radar image; and
superimposing the vertical image plane radar image on the vertical plane camera image.

14. The method of claim 10, further comprising:
detecting, in the transformed camera image, two or more road markings;
determining a number of pixels between the detected two or more road markings in the transformed image; and
determining the resolution of the camera image based on a real-world distance of the detected road markings and the determined number of pixels between the detected two or more road markings in the transformed image.

15. The method of claim 10, further comprising cropping the radar image based on an overlapping of fields of view of the camera and image data and generating the scaled radar image from the cropped radar image.

16. The method of claim 10, further comprising undistorting the vertical image plane camera image data prior to transforming the camera image to the horizontal image plane, wherein the received camera image is distorted.

17. The method of claim 14, further comprising determining the resolution of the camera image based on real-world dimensions of at least one of a guard rail, light pole, traffic sign, and wall, detected in the transformed camera image.

* * * * *